(12) United States Patent
Benhase et al.

(10) Patent No.: US 7,681,047 B2
(45) Date of Patent: Mar. 16, 2010

(54) DECRYPTION OF DATA IN STORAGE SYSTEMS

(75) Inventors: Michael Thomas Benhase, Tucson, AZ (US); Susan Kay Candelaria, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1002 days.

(21) Appl. No.: 11/407,182

(22) Filed: Apr. 18, 2006

(65) Prior Publication Data

US 2007/0245160 A1 Oct. 18, 2007

(51) Int. Cl.
*G06F 11/30* (2006.01)
*G06F 12/14* (2006.01)
*H04L 29/06* (2006.01)

(52) U.S. Cl. .................. 713/193; 713/165; 711/118; 711/133; 711/135

(58) Field of Classification Search .................. 713/193, 713/165; 711/118, 133, 135
See application file for complete search history.

(56) References Cited

U.S. PATENT DOCUMENTS

| | | | |
|---|---|---|---|
| 5,444,781 A | | 8/1995 | Lynn et al. |
| 5,544,342 A | * | 8/1996 | Dean .......................... 711/119 |
| 5,943,421 A | | 8/1999 | Grabon |
| 5,991,753 A | | 11/1999 | Wilde |
| 6,175,896 B1 | | 1/2001 | Bui |
| 6,438,664 B1 | * | 8/2002 | McGrath et al. ............. 711/154 |
| 6,463,509 B1 | * | 10/2002 | Teoman et al. ............... 711/137 |
| 6,523,118 B1 | * | 2/2003 | Buer .......................... 713/189 |
| 2001/0018736 A1 | * | 8/2001 | Hashimoto et al. ............. 713/1 |
| 2002/0087800 A1 | * | 7/2002 | Abdallah et al. ............ 711/137 |
| 2002/0194133 A1 | | 12/2002 | Castueil et al. |
| 2003/0005314 A1 | | 1/2003 | Gammel et al. |
| 2003/0046563 A1 | * | 3/2003 | Ma et al. ..................... 713/190 |
| 2003/0177386 A1 | | 9/2003 | Cuomo et al. |
| 2003/0188178 A1 | * | 10/2003 | Strongin et al. ............. 713/193 |
| 2004/0015687 A1 | | 1/2004 | Chiarabini et al. |
| 2004/0062391 A1 | | 4/2004 | Tsunoo |
| 2006/0085602 A1 | * | 4/2006 | Huggahalli et al. ......... 711/137 |

FOREIGN PATENT DOCUMENTS

EP 0 468 910 A2 1/1992

OTHER PUBLICATIONS

Boal, Paul E. "Application-Level Data Caching", Dec. 2003.*
Fritts, Jason. "Multi-Level Memory Prefetching for Media and Stream Processing", Proceedings of the 2002 International Conference on Multimedia and Expo, 2002.*
Nesbit, Kyle J. et al. "Data Cache Prefetching Using a Global History Buffer", IEEE, Apr. 2005.*
EPO Communication pursuant to Article 94(3) EPC dated Feb. 18, 2009 for Application No. 07 727 452.0—1245 IBM.
PCT International Search Report and Written Opinion dated Jul. 30, 2007 for application No. PCT/EP2007/052980 filed Mar. 28, 2007.
Response dated Aug. 20, 2009 to EPO Communication pursuant to Article 94(3) EPC dated Feb. 18, 2009 for Application No. 07 727 452.0—1245 IBM.

* cited by examiner

*Primary Examiner*—Michael J Simitoski
(74) *Attorney, Agent, or Firm*—Rabindranath Dutta; Konrad Raynes & Victor LLP

(57) ABSTRACT

Provided are a method, system, and article of manufacture, wherein a controller receives encrypted data from a first storage unit coupled to the controller. The received encrypted data is stored in a second storage unit coupled to the controller, wherein the controller is capable of accessing the second storage unit faster in comparison to the first storage unit. The encrypted data is maintained in the second storage unit, until at least one condition is satisfied.

20 Claims, 5 Drawing Sheets

DECRYPTION OF DATA IN STORAGE SYSTEMS

BACKGROUND

1. Field

The disclosure relates to a method, system, and article of manufacture for the decryption of data in storage systems

2. Background

Encryption of data in a network may be categorized into two different types—encryption of "data in motion" and encryption of "data at rest". Encryption of "data in motion" provides security to data as the data is moving across the network between a sender and a recipient. "Data in motion" may also be referred to as "data in flight". Encryption of "data at rest" is the encryption of data that is being stored in a storage medium and is not undergoing transmission. For example, the encryption of data stored in a disk or the encryption of data in a database may be referred to as encryption of "data at rest".

Encryption of "data at rest" is desirable for protecting data stored in a disk. Encryption of data performed via hardware is referred to as hardware encryption, and encryption of data performed via software is referred to as software encryption. While hardware encryption is faster in comparison to software encryption, such hardware encryption may not be available in many situations, e.g., hardware encryption may not be available on certain disk Fibre Channel interfaces. In many cases, software encryption is used for the encryption of "data at rest".

Certain disk staging algorithms perform speculative prefetching of data from secondary storage to the cache to improve the read hit ratio on the cache. Performing decryption on the speculatively prefetched data can lead to performance degradation. Reducing the amount of data that is speculatively prefetched can reduce the amount of decryption to be performed. However, reducing the amount of data that is speculatively prefetched may lower the read hit ratio and degrade performance. Speculative prefetching is often used in storage systems because once the disk head is positioned on the desired data, transferring additional data to cache along with the desired data takes very little additional time in comparison to the time taken to position the head on the desired data.

SUMMARY OF THE DESCRIBED EMBODIMENTS

Provided are a method, system, and article of manufacture, wherein a controller receives encrypted data from a first storage unit coupled to the controller. The received encrypted data is stored in a second storage unit coupled to the controller, wherein the controller is capable of accessing the second storage unit faster in comparison to the first storage unit. The encrypted data is maintained in the second storage unit, until at least one condition is satisfied.

In further embodiments, the controller receives a request to access the encrypted data maintained in the second storage unit, wherein the at least one condition is satisfied on receiving the request to access the encrypted data maintained in the second storage unit. The encrypted data maintained in the second storage unit is decrypted, in response to receiving the request to access the encrypted data maintained in the second storage unit.

In yet further embodiments an encryption indicator data structure associated with the second storage unit is maintained, wherein the encryption indicator data structure is capable of indicating whether data maintained in the second storage unit is encrypted. The encryption indicator data structure is updated to indicate that the encrypted data maintained in the second storage unit is unencrypted, in response to decrypting the encrypted data maintained in the second storage unit.

In additional embodiments, a determination is made by the controller, that the load on the controller is below a predetermined threshold, wherein the at least one condition is satisfied on determining by the controller that the load on the controller is below the predetermined threshold. The encrypted data maintained in the second storage unit is decrypted, in response to determining, by the controller, that the load on the controller is below a predetermined threshold.

In further additional embodiments, the first storage unit is comprised of disks and the second storage unit is a cache.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a "decrypt on demand" solution for maintaining and accessing data stored in the cache of a storage system. In "decrypt on demand", speculative prefetching is performed to improve the read hit ratio. However, the speculatively prefetched data that is held in cache is left encrypted. In certain embodiments, the speculatively prefetched data is not decrypted unless and until the data is accessed. In other embodiments, the speculatively prefetched data is decrypted when the load on the storage system is below a predetermined threshold.

Figure 1:
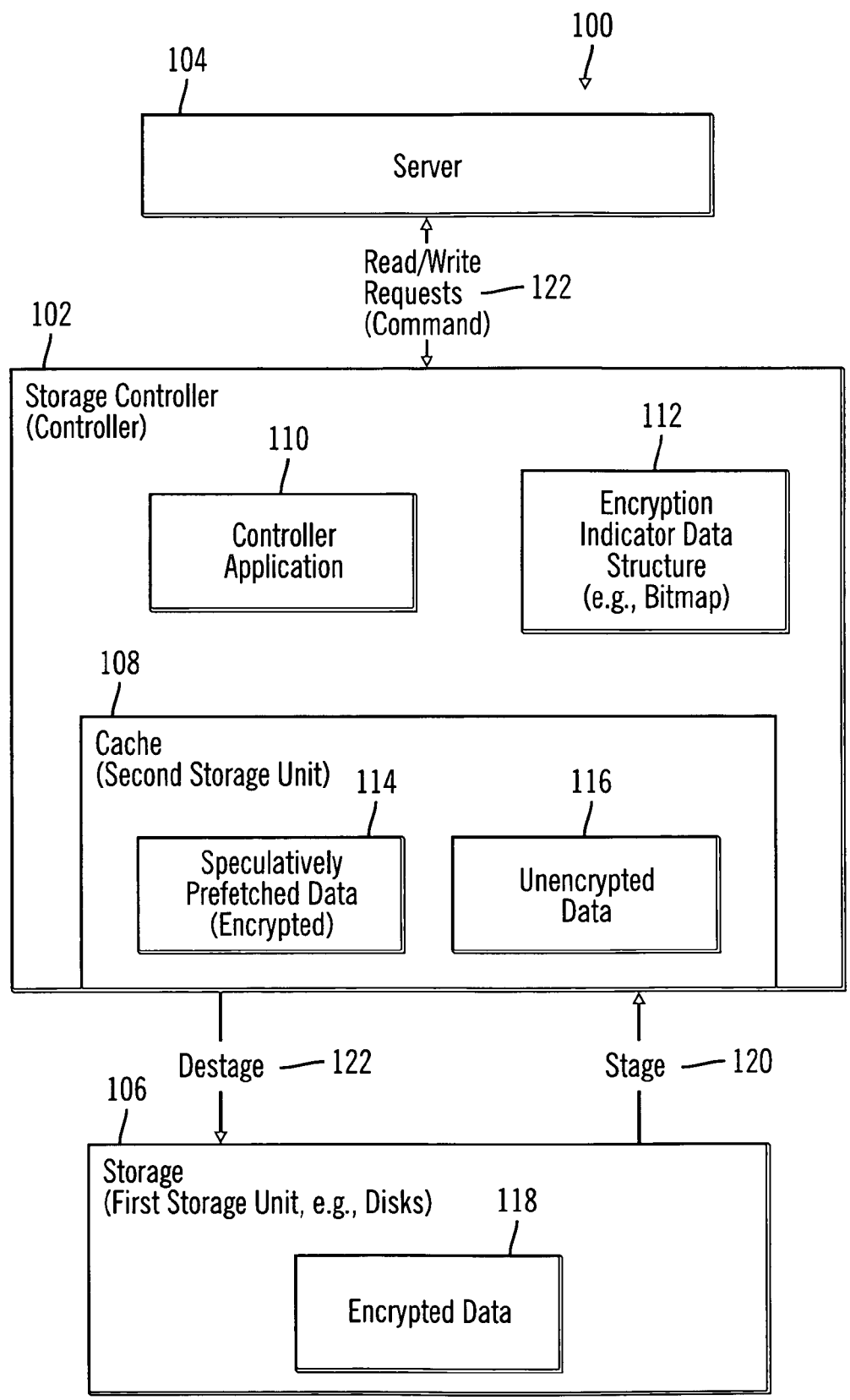
FIG. 1 illustrates a block diagram of a computing environment in accordance with certain embodiments.

FIG. 1 illustrates a block diagram of a computing environment 100 in accordance with certain embodiments. The computing environment 100 includes a storage controller 102, also referred to as a controller, that is coupled to a server 104 and a storage 106. The storage controller 102 and the server 104 may be any suitable computational device including those presently known in the art, such as, a personal computer, a workstation, a mainframe, a hand held computer, a palm top computer, a telephony device, a network appliance, a blade computer, etc. The storage 106 may include any suitable storage medium including those presently known in the art, such as, magnetic or optical disks, tapes, etc.

The storage controller 102 includes a cache 108, a controller application 110, and an encryption indicator data structure 112. The cache 108 may include speculatively prefetched data 114 that may be left encrypted unless and until the speculatively prefetched data 114 is accessed, and unencrypted data 116. The storage 106 encrypts data at rest and the data stored in the storage 106 is shown in FIG. 1 as encrypted data 118. The controller application 110 may stage 120, i.e., copy, the encrypted data 118 from the storage 106 to the cache 108. When the encrypted data 118 has not been requested specifically by the server 104, but is staged 120 in anticipation of a future request for the encrypted data 118 from the server 104, the encrypted-data 118 when stored in the cache 108 may be referred to as the speculatively prefetched data 114. Data may also be destaged 122, i.e., moved, from the cache 108 to the storage 106 by the controller application 112. The encryption indicator data structure 112 stores information that identifies whether data stored in the cache 108 of the storage controller 102 is encrypted data or decrypted data. For example, in certain embodiments, a bit map that implements the encryption indicator data structure 112 may used be to identify which data in the cache 108 is encrypted.

In certain embodiments, the server 104 sends read and/or write requests 122 for data to the storage controller 102. The controller application 110 attempts to first satisfy a request 122 from the cache 108 and if the request 122 cannot be satisfied via the cache 108 the controller application 110 uses the storage 106 via the stages 120 and destages 122 to satisfy the request.

Figure 2:
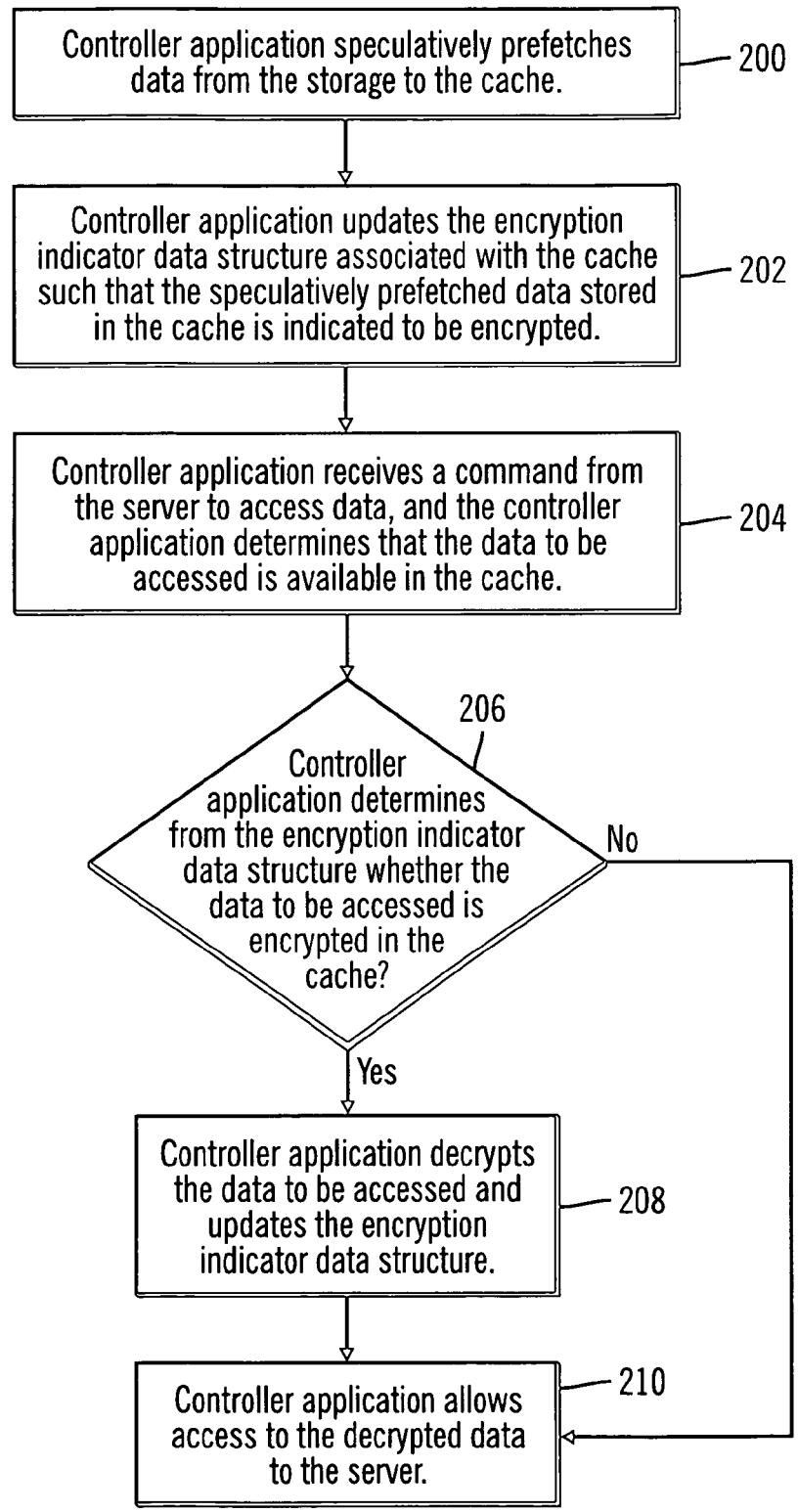
FIG. 2 illustrates first operations for decrypting data on demand, in accordance with certain embodiments.

FIG. 2 illustrates first operations for decrypting data on demand, in accordance with certain embodiments. The operations illustrated in FIG. 2 may be implemented in the controller application 110 of the storage controller 102.

Control starts at block 200, where the controller application 110 speculatively prefetches data from the storage 106 to the cache 108. Speculative prefetching of data may be performed in many different ways. For example, in certain embodiments when data requested by the server 104 that is not to be found in the cache 108 is staged 120 from the storage 106 to the cache 108, additional data may also be staged from the storage 106 to the cache 108 and such additional data may be referred to as speculatively prefetched data 114. Since the data stored in the storage 106 is encrypted data at rest, the speculatively prefetched data 114 is encrypted data.

The controller application updates (at block 202) the encryption indicator data structure 112 associated with the cache 108, such that the speculatively prefetched data 114 stored in the cache is indicated to be encrypted.

The controller application 110 receives (at block 204) a command 122, i.e., a request, from the server 102 to access data, and the controller application 110 determines that the data to be accessed is available in the cache 108. The controller application 110 determines (at block 206) from the encryption indicator data structure 112 whether the data to be accessed is encrypted. If so, control proceeds to block 208, where the controller application 110 decrypts the data to be accessed and updates the encryption indicator data structure 112 to indicate that the data is decrypted data. Subsequently, the controller application 110 allows (at block 210) access to the decrypted data to the server 100.

If at block 206, the controller application determines from the encryption indicator data structure 112 that the data to be accessed is not encrypted in the cache, then control proceeds to block 210, where the controller application 110 allows access to the decrypted data to the server 100.

Therefore, FIG. 2 illustrates certain embodiments in which the controller application 110 speculatively prefetches data from the storage 106 to the cache 108 and maintains the prefetched data in an encrypted state unless and until a request for accessing the data is received from the server 104. The speculatively prefetched data 114 is decrypted in response to a request from the server 104 to access the data. The processing overhead on the storage controller is reduced because speculatively prefetched data 114 that is not accessed by the server 104 remains encrypted and may be destaged 122 at a later time from the cache 108 to the storage 106.

Figure 3:
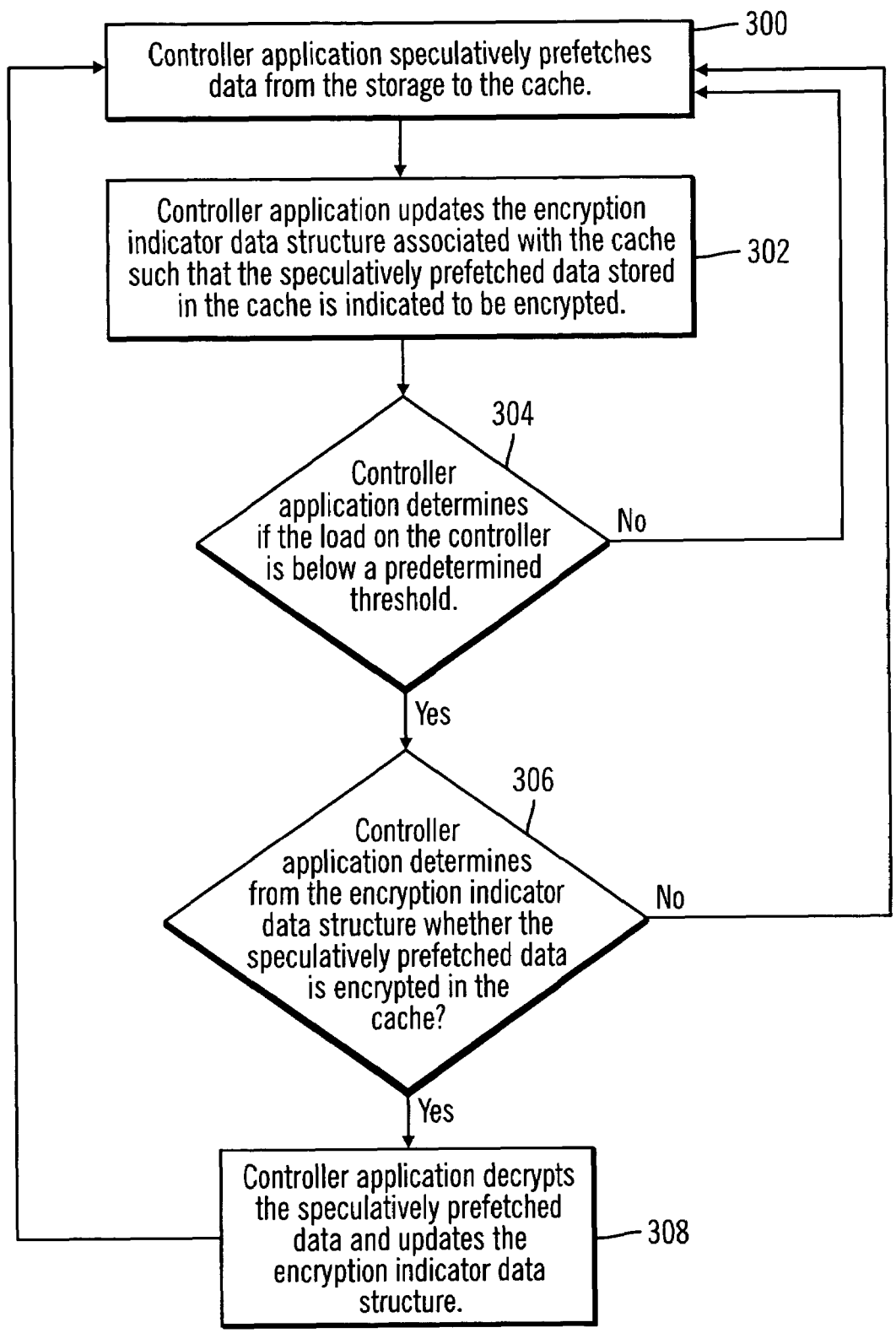
FIG. 3 illustrates second operations for decrypting data on demand, in accordance with certain embodiments.

FIG. 3 illustrates second operations for decrypting data on demand, in accordance with certain embodiments. The operations illustrated in FIG. 3 may be implemented in the controller application 110 of the storage controller 102.

Control starts at block 300, where the controller application 110 speculatively prefetches data from the storage 106 to the cache 108. The controller application 110 updates (at block 302) the encryption indicator data structure 112 associated with the cache 108, such that the speculatively prefetched data 114 stored in the cache 108 is indicated to be encrypted.

Control proceeds to block 304, where the controller application 110 determines if the load on the controller 102 is below a predetermined threshold. The predetermined threshold may be set via a program and/or may be set by an administrator of the controller 102. The load on the controller 102 may include a measurement of the processor utilization on the controller 102 where greater processor utilization may correspond to a greater load on the controller.

If the controller application 110 determines that the load on the controller 102 is below the predetermined threshold then the controller application 110 determines (at block 306) from the encryption indicator data structure 112 whether the speculatively prefetched data 114 is encrypted. If so, the controller application decrypts the speculatively prefetched data 114 and updates the encryption indicator data structure 112 to indicate that the speculatively prefetched data is unencrypted.

If at block 304, the controller application 110 determines that the load on the controller 102 is not below a predetermined threshold then the controller application 110 continues to speculatively prefetch (at block 300) data from the storage 106 to the cache 108. If at block 306, the controller application 110 determines from the encryption indicator data structure 112 that the speculatively prefetched data 114 is not encrypted in the cache 108 then the controller application 110 continues to speculatively prefetch (at block 300) data from the storage 106 to the cache 108.

Therefore, FIG. 3 illustrates certain embodiments in which speculatively prefetched data 114 in the cache is decrypted when the load on the storage controller 102 is below a predetermined threshold.

Figure 4:
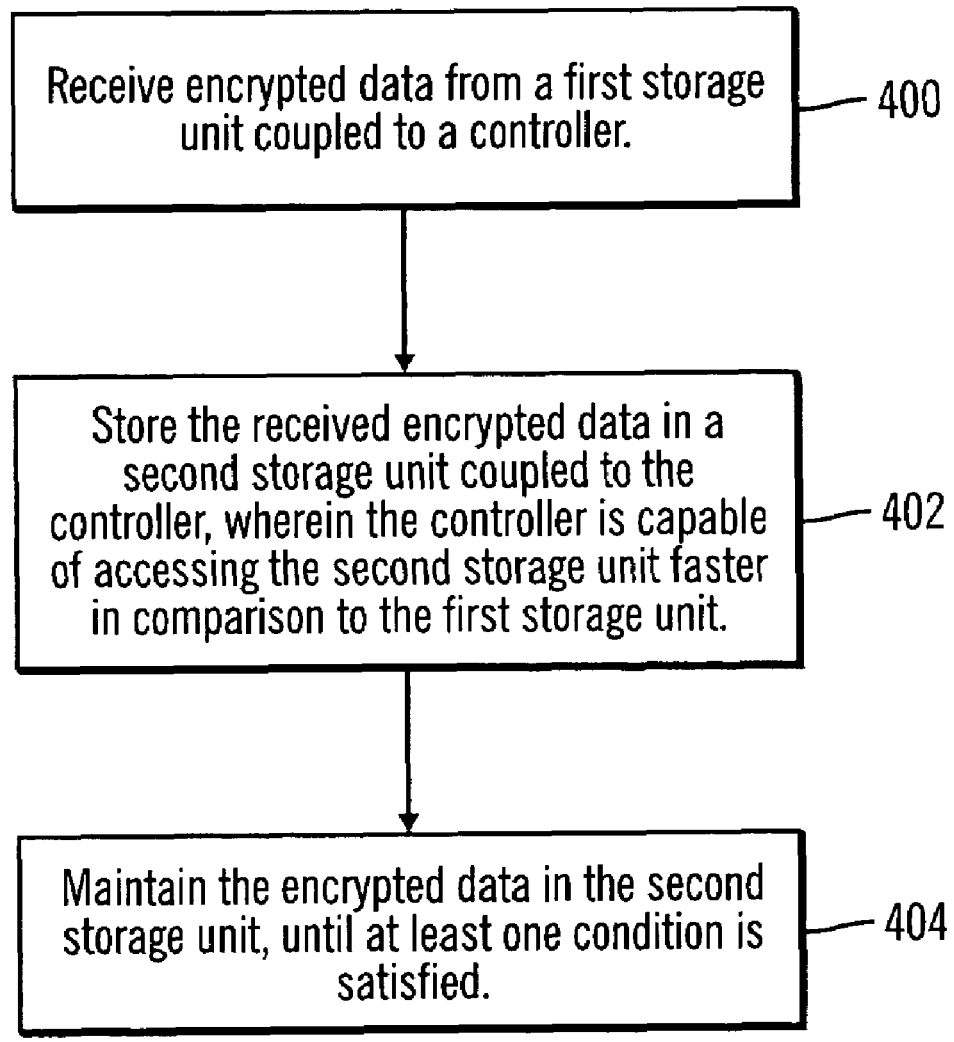
FIG. 4 illustrates third operations implemented in a controller for maintaining encrypted data, in accordance with certain embodiments.

FIG. 4 illustrates third operations implemented in the controller 102 for maintaining encrypted data, in accordance with certain embodiments. The operations illustrated in FIG. 4 may be implemented in the controller application 110 of the controller 102.

Control starts at block 400, where the controller 102 may receive encrypted data from a first storage unit 106 coupled to the controller 102. In certain embodiments, the first storage unit 106 is comprised of disks.

The received encrypted data is stored (at block 402) in a second storage unit 108 coupled to the controller 102, wherein the controller 102 is capable of accessing the second storage unit 108 faster in comparison to the first storage unit 106. In certain embodiments, the second storage unit 108 is a cache.

The encrypted data is maintained (at block 404) in the second storage unit 108, until at least one condition is satisfied. In certain embodiments, the at least one condition is satisfied on determining by the controller 102 that the load on the controller 102 is below the predetermined threshold. In certain other embodiments, the at least one condition is satisfied on receiving the request to access the encrypted data maintained in the second storage unit 108.

Certain embodiments allow speculative prefetching of encrypted data from disks 106 to cache 108, even when hardware encryption/decryption is unavailable in the storage controller 102. The speculatively prefetched data 114 is maintained in an encrypted state until a request to access the data is received. In alternative embodiments, the speculatively prefetched data 114 is decrypted when the load on storage controller is below a predetermined threshold. As a result of speculative prefetching of data from the storage 106 to the cache 108 the read hit ratio on the cache is improved. Performance degradation is reduced because the speculatively prefetched data 114 is decrypted when a request to access the encrypted speculatively prefetched data 114 is received or when the load on the controller 102 is below a predetermined threshold.

ADDITIONAL EMBODIMENT DETAILS

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
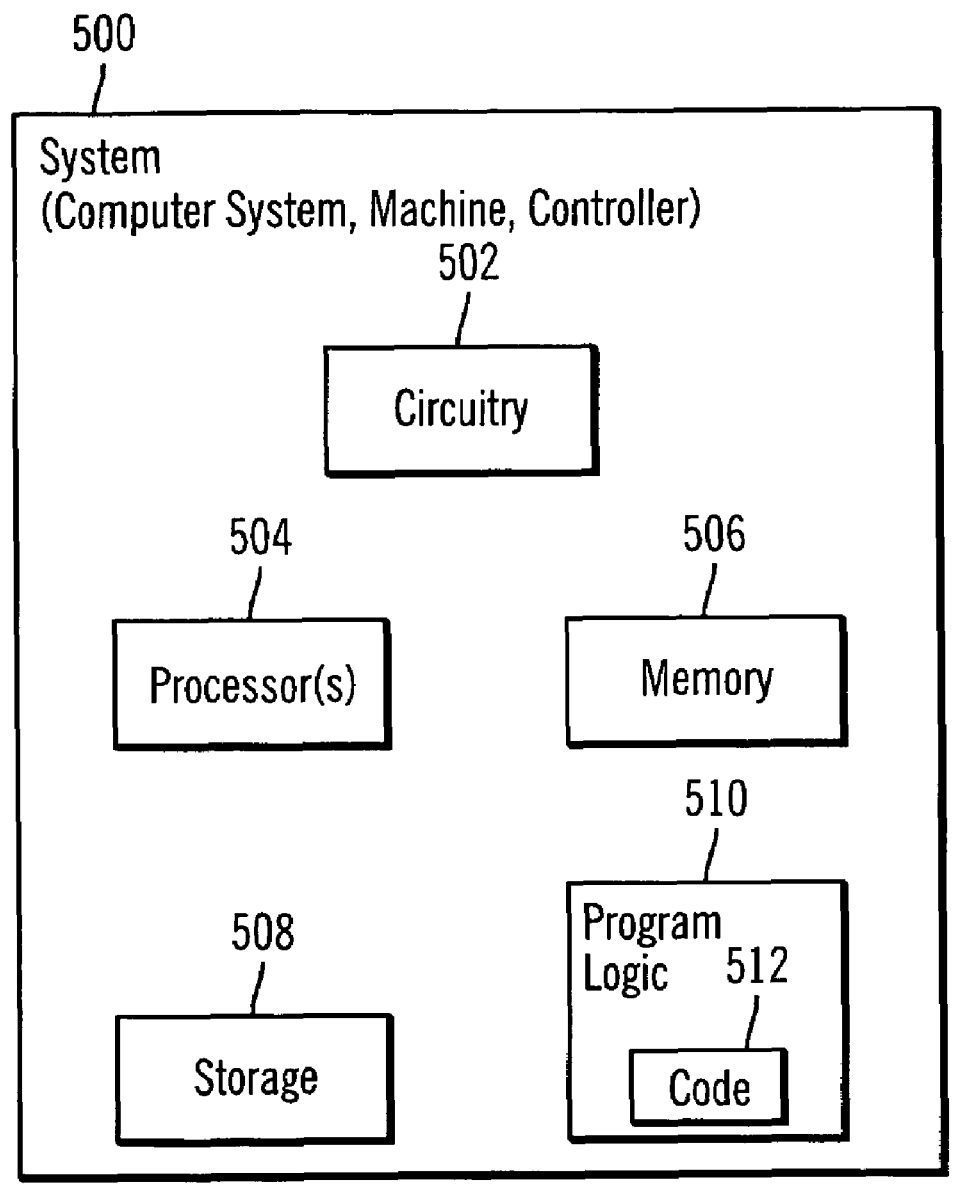
FIG. 5 illustrates the architecture of computing system, wherein in certain embodiments the controller of the computing environment of FIG. 1 may be implemented in accordance with the architecture of the computing system.

FIG. 4 illustrates an exemplary computer system 500, wherein in certain embodiments the storage controller 102 and the server 102 of the computing environment 100 of FIG. 1 may be implemented in accordance with the computer architecture of the computer system 500. The computer system 500 may also be referred to as a system, and may include a circuitry 502 that may in certain embodiments include a processor 504. The system 500 may also include a memory 506 (e.g., a volatile memory device), and storage 508. Certain elements of the system 500 may or may not be found in the storage controller 102 and the server 104 of FIG. 1. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 2, 3 and 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method implemented in a controller, the method comprising:
   receiving encrypted data from a first storage unit coupled to the controller;
   storing the received encrypted data in a second storage unit coupled to the controller, wherein the controller is operable to access the second storage unit faster in comparison to the first storage unit;
   maintaining the encrypted data in the second storage unit, until at least one condition is satisfied;
   determining, by the controller, that the load on the controller is below a predetermined threshold, wherein the at least one condition is satisfied on determining by the controller that the load on the controller is below the predetermined threshold; and
   decrypting the encrypted data maintained in the second storage unit, in response to determining, by the controller, that the load on the controller is below the predetermined threshold.

2. The method of claim 1, further comprising:
   receiving, by the controller, a request to access the encrypted data maintained in the second storage unit, wherein the at least one condition is satisfied on receiving the request to access the encrypted data maintained in the second storage unit; and
   decrypting the encrypted data maintained in the second storage unit, in response to receiving the request to access the encrypted data maintained in the second storage unit.

3. The method of claim 2, further comprising:
   maintaining an encryption indicator data structure associated with the second storage unit, wherein the encryption indicator data structure indicates whether data maintained in the second storage unit is encrypted; and
   updating the encryption indicator data structure to indicate that the encrypted data maintained in the second storage unit is unencrypted, in response to decrypting the encrypted data maintained in the second storage unit.

4. The method of claim 1, wherein the first storage unit is comprised of disks and the second storage unit is a cache.

5. A system in communication with a first storage unit, the system comprising:
   a controller coupled to the first storage unit;
   a second storage unit coupled to the controller;
   a processor included in the controller; and
   a memory coupled to the processor, wherein the processor performs operations, the operations comprising:
   (i) receiving encrypted data from the first storage unit coupled to the controller;
   (ii) storing the received encrypted data in a second storage unit coupled to the controller, wherein the controller is operable to access the second storage unit faster in comparison to the first storage unit;
   (iii) maintaining the encrypted data in the second storage unit, until at least one condition is satisfied;
   (iv) determining that the load on the controller is below a predetermined threshold, wherein the at least one condition is satisfied on determining that the load on the controller is below the predetermined threshold; and
   (v) decrypting the encrypted data maintained in the second storage unit, in response to determining that the load on the controller is below the predetermined threshold.

6. The system of claim 5, the operations further comprising:
   receiving, by the controller, a request to access the encrypted data maintained in the second storage unit, wherein the at least one condition is satisfied on receiving the request to access the encrypted data maintained in the second storage unit; and
   decrypting the encrypted data maintained in the second storage unit, in response to receiving the request to access the encrypted data maintained in the second storage unit.

7. The system of claim 6, the operations further comprising:
   maintaining an encryption indicator data structure associated with the second storage unit, wherein the encryption indicator data structure indicates whether data maintained in the second storage unit is encrypted; and
   updating the encryption indicator data structure to indicate that the encrypted data maintained in the second storage unit is unencrypted, in response to decrypting the encrypted data maintained in the second storage unit.

8. The system of claim 6, wherein the first storage unit is comprised of disks and the second storage unit is a cache.

9. A method for deploying computing infrastructure, comprising integrating computer-readable code into a controller, wherein the code in combination with the controller performs:

receiving encrypted data from a first storage unit coupled to the controller;

storing the received encrypted data in a second storage unit coupled to the controller, wherein the controller is operable to access the second storage unit faster in comparison to the first storage unit;

maintaining the encrypted data in the second storage unit, until at least one condition is satisfied;

determining, by the controller, that the load on the controller is below a predetermined threshold, wherein the at least one condition is satisfied on determining by the controller that the load on the controller is below the predetermined threshold; and decrypting the encrypted data maintained in the second storage unit, in response to determining, by the controller, that the load on the controller is below the predetermined threshold.

10. The method for deploying computing infrastructure of claim 9, wherein the code in combination with the computing system further performs:

receiving, by the controller, a request to access the encrypted data maintained in the second storage unit, wherein the at least one condition is satisfied on receiving the request to access the encrypted data maintained in the second storage unit; and decrypting the encrypted data maintained in the second storage unit, in response to receiving the request to access the encrypted data maintained in the second storage unit.

11. The method for deploying computing infrastructure of claim 10, wherein the code in combination with the computing system further performs:

maintaining an encryption indicator data structure associated with the second storage unit, wherein the encryption indicator data structure indicates whether data maintained in the second storage unit is encrypted; and updating the encryption indicator data structure to indicate that the encrypted data maintained in the second storage unit is unencrypted, in response to decrypting the encrypted data maintained in the second storage unit.

12. The method for deploying computing infrastructure of claim 9, wherein the first storage unit is comprised of disks and the second storage unit is a cache.

13. A system, comprising:

a controller;

means for receiving encrypted data from a first storage unit coupled to the controller;

means for storing the received encrypted data in a second storage unit coupled to the controller, wherein the controller is operable to access accessing the second storage unit faster in comparison to the first storage unit;

means for maintaining the encrypted data in the second storage unit, until at least one condition is satisfied;

means for determining, by the controller, that the load on the controller is below a predetermined threshold, wherein the at least one condition is satisfied on determining by the controller that the load on the controller is below the predetermined threshold; and means for decrypting the encrypted data maintained in the second storage unit, in response to determining, by the controller, that the load on the controller is below the predetermined threshold.

14. The system of claim 13, further comprising:

means for receiving, by the controller, a request to access the encrypted data maintained in the second storage unit, wherein the at least one condition is satisfied on receiving the request to access the encrypted data maintained in the second storage unit; and means for decrypting the encrypted data maintained in the second storage unit, in response to receiving the request to access the encrypted data maintained in the second storage unit.

15. The system of claim 14, further comprising:

means for maintaining an encryption indicator data structure associated with the second storage unit, wherein the encryption indicator data structure indicates whether data maintained in the second storage unit is encrypted; and means for updating the encryption indicator data structure to indicate that the encrypted data maintained in the second storage unit is unencrypted, in response to decrypting the encrypted data maintained in the second storage unit.

16. The system of claim 13, wherein the first storage unit is comprised of disks and the second storage unit is a cache.

17. A computer readable storage medium, wherein the computer readable storage medium includes machine readable instructions stored thereon, wherein the machine readable instructions cause operations on a controller, the operations comprising:

receiving encrypted data from a first storage unit coupled to the controller;

storing the received encrypted data in a second storage unit coupled to the controller, wherein the controller is operable to access accessing the second storage unit faster in comparison to the first storage unit;

maintaining the encrypted data in the second storage unit, until at least one condition is satisfied;

determining, by the controller, that the load on the controller is below a predetermined threshold, wherein the at least one condition is satisfied on determining by the controller that the load on the controller is below the predetermined threshold; and decrypting the encrypted data maintained in the second storage unit, in response to determining, by the controller, that the load on the controller is below the predetermined threshold.

18. The computer readable storage medium of claim 17, the operations further comprising:

receiving, by the controller, a request to access the encrypted data maintained in the second storage unit, wherein the at least one condition is satisfied on receiving the request to access the encrypted data maintained in the second storage unit; and decrypting the encrypted data maintained in the second storage unit, in response to receiving the request to access the encrypted data maintained in the second storage unit.

19. The computer readable storage medium of claim 18, the operations further comprising:

maintaining an encryption indicator data structure associated with the second storage unit, wherein the encryp tion indicator data structure indicates whether data maintained in the second storage unit is encrypted; and updating the encryption indicator data structure to indicate that the encrypted data maintained in the second storage unit is unencrypted, in response to decrypting the encrypted data maintained in the second storage unit.

20. The computer readable storage medium of claim 17, wherein the first storage unit is comprised of disks and the second storage unit is a cache.

* * * * *